(12) United States Patent
Yu et al.

(10) Patent No.: US 11,293,831 B2
(45) Date of Patent: Apr. 5, 2022

(54) GAS PIPELINE LEAKAGE MONITORING SYSTEM AND MONITORING METHOD

(71) Applicant: WINDINFO PTY LTD, Lawson (AU)

(72) Inventors: Shuhui Yu, Lawson (AU); Feng Zhang, Lawson (AU)

(73) Assignee: WINDINFO PTY LTD, Lawson (AU)

( * ) Notice: Subject to any disclaimer, the term of this patent is extended or adjusted under 35 U.S.C. 154(b) by 327 days.

(21) Appl. No.: 16/676,389

(22) Filed: Nov. 6, 2019

(65) Prior Publication Data

US 2021/0131905 A1    May 6, 2021

(51) Int. Cl.
   *G01M 3/28*    (2006.01)
   *F17D 5/00*    (2006.01)
   *F17D 5/02*    (2006.01)

(52) U.S. Cl.
   CPC ........... *G01M 3/2815* (2013.01); *F17D 5/005* (2013.01); *F17D 5/02* (2013.01)

(58) Field of Classification Search
   CPC ............ G01M 3/00; G01M 3/26; G01M 3/28; G01M 3/2815; F17D 5/00; F17D 5/005; F17D 5/02; F17D 5/06
   See application file for complete search history.

(56) References Cited

FOREIGN PATENT DOCUMENTS

| CN | 203477909 U | * | 3/2014 | ............... F17D 5/06 |
|---|---|---|---|---|
| CN | 203477909 U |   | 3/2014 |   |
| JP | 2017072448 A | * | 4/2017 | ............. G01M 3/24 |
| WO | WO-2019069091 A | * | 4/2019 | .......... G01M 3/2815 |

* cited by examiner

*Primary Examiner* — Nguyen Q. Ha
(74) *Attorney, Agent, or Firm* — Platinum Intellectual Property LLP

(57) ABSTRACT

The present invention provides a gas pipeline leakage monitoring system and a monitoring method, which solve the technical problem that the existing gas pipeline network leakage monitoring method has low monitoring efficiency and poor accuracy due to the presence of interference signals. In the present invention, the gas pipeline leakage monitoring system is provided with a pressure regulating apparatus, and further provided with a control apparatus, a front end and a rear end of the pressure regulating apparatus each are provided with a signal collecting apparatus, the signal collecting apparatus is for collecting signals at the front end and the rear end of the pressure regulating apparatus and uploading the signals to the control apparatus, and the signal collecting apparatus is provided with a timing apparatus. Meantime, the present invention provides a gas pipeline leakage monitoring method. The present invention can be widely applied to leakage monitoring of a gas pipeline.

15 Claims, 5 Drawing Sheets

GAS PIPELINE LEAKAGE MONITORING SYSTEM AND MONITORING METHOD

BACKGROUND OF THE INVENTION

Field of the Invention

The present invention relates to the field of pipeline network monitoring technology, and particularly to a method for monitoring the state of a valve port of a pressure regulating apparatus in real time and estimating the downstream flow amount.

Description of the Related Art

With the rapid development of society, natural gas, as an efficient and clean energy source, is the third largest natural energy source following coal and oil, and has entered various fields of life now. Natural gas needs to be subjected to multi-stage pressure regulating before it can be used by users. A gas pressure regulating valve is a main pressure regulating component in the natural gas transmission pipeline. The gas pressure regulating valve automatically changes the gas flow amount through a regulating valve to keep the outlet gas at a predetermined pressure, and is usually classified into two types: a direct acting type and an indirect acting type. The pressure regulating valve is a special valve in the gas pipeline, and an apparatus that keeps the downstream pressure stable regardless of the change of the flow amount of the gas and the upstream pressure.

The valve port of the pressure regulating valve is the medium-low pressure connection point. When the gas flows to this point, the flow state will change due to the change of pressure and pipeline diameter. In particular, the pressure jump similar to the negative pressure wave will be generated at the moment when the valve port of the gas pressure regulating valve is opened, and a large number of low-frequency continuous sound waves will be generated after the valve port is opened. These problems are often overlooked by people during the gas pipeline network leakage monitoring research.

SUMMARY OF THE INVENTION

The present invention aims at the technical problem that the existing gas pipeline network leakage monitoring method has low monitoring efficiency and poor accuracy due to the presence of interference signals, and provides a gas pipeline leakage monitoring system and a monitoring method which determine whether there is a leakage by monitoring the state of the valve port.

To this end, the technical solution of the present invention is a gas pipeline leakage monitoring system provided with a pressure regulating apparatus, the gas pipeline leakage monitoring system is further provided with a control apparatus, a front end and a rear end of the pressure regulating apparatus each are provided with a signal collecting apparatus, the signal collecting apparatus is for collecting signals at the front end and the rear end of the pressure regulating apparatus and uploading the signals to the control apparatus, and the signal collecting apparatus is provided with a timing apparatus.

Preferably, the signal collecting apparatus uses a pressure transmitter, the front end of the pressure regulating apparatus is provided with a front end pressure transmitter, the rear end of the pressure regulating apparatus is provided with a rear end pressure transmitter, and the front end pressure transmitter and the rear end pressure transmitter are mounted at two sides of a valve port of the pressure regulating apparatus.

Preferably, the signal collecting apparatus uses a pressure transmitter, the front end of the pressure regulating apparatus is provided with a front end pressure transmitter, the rear end of the pressure regulating apparatus is provided with a rear end pressure transmitter, and the front end pressure transmitter and the rear end pressure transmitter are mounted in pipelines at the front end and the rear end of the pressure regulating apparatus.

Preferably, the signal collecting apparatus uses a sound wave collector or an acceleration sensor.

The present invention also provides a method for monitoring gas pipeline leakage by the gas pipeline leakage monitoring system, comprising the following steps: analyzing a signal collected by the signal collecting apparatus in the same time window, and determining whether a valve port of the pressure regulating apparatus is in an open state or a closed state, so as to realize monitoring of gas pipeline leakage.

Preferably, a sudden leakage of an upstream pipeline network can be monitored by judging a state of the valve port of the pressure regulating apparatus, specific steps are: firstly, filtering a negative pressure wave signal generated by opening the valve port in each node, and then performing a similarity analysis on signals using a cross-correlation equation to determine whether there is a leakage; for the upstream pipeline network, after excluding a valve port opening signal of a pressure regulating valve by determining the state of the valve port, a signal source position of a negative pressure wave occurring at an upstream can be calculated according to precise timing of the timing apparatus, and a signal is further determined to be a leakage signal.

Preferably, by monitoring a state of the valve port of the pressure regulating apparatus in a community at night, it is judged whether the open state and the closed state of the valve port are periodically presented, monitoring of a micro leakage in a pipeline can be realized, and if the state of the valve port of the pressure regulating apparatus changes in a fixed maximum period at night, it is judged that there is a leakage, a leakage amount is calculated, and an alarm signal is issued; otherwise, it cannot be judged that there is a leakage.

Preferably, a specific method of analyzing a signal collected by the signal collecting apparatus in the same time window is: (1) the timing apparatus times the signal collecting apparatus, the signal collecting apparatus collects signals at the front end and the rear end of the pressure regulating apparatus and uploads the signals to the control apparatus; (2) the control apparatus analyzes the signals in combination with the collecting time thereof, and judges the state of the valve port of the pressure regulating apparatus.

Preferably, the state of the valve port of the pressure regulating apparatus is judged according to a sampling value of a pressure signal, judging steps are:

a. taking pressure waveforms of a front end pressure transmitter and a rear end pressure transmitter of the pressure regulating apparatus in the same time window, and performing differential filtering on each of the two waveforms to obtain a front end waveform $X_m(t)$ and obtain a rear end waveform $X_n(t)$;

b. taking pressure values $(t_1, P_{11})$, $(t_1, P_{12})$ ... $(t_n, P_{1n})$, $(t_n, P_{2n})$, corresponding to the same time point of $X_m(t)$ and $X_n(t)$ to obtain $\Delta p_1 = |P_{11} - P_{21}|$ ... $\Delta p_n = |P_{1n} - P_{2n}|$;

c. establishing a relationship curve $S_{\Delta P}(t)$ between time t and $\Delta p$, and performing determination according to a resolving accuracy of a sensor, wherein if the curve is between two parallel lines, it means that the front end waveform $X_m(t)$ of the pressure regulating apparatus is approximately similar to the rear end waveform $X_n(t)$ of the pressure regulating apparatus, and it is judged that the valve port of the pressure regulating apparatus is in the open state;

d. if an amplitude range of the curve exceeds a limit range of two parallel lines, it means that the front end waveform $X_m(t)$ of the pressure regulating apparatus is inconsistent with the rear end waveform $X_n(t)$ of the pressure regulating apparatus, it is preliminarily judged that the valve port is in the closed state, and the state of the valve port is further confirmed by a balance formula provided by the pressure regulating apparatus itself.

Preferably, a specific method for judging an approximation of the relationship curve between t and $\Delta p$ is: $\Delta p$ in the curve $S_{\Delta P}(t)$ is a difference value between pressure sampling values at the same time of the front end pressure transmitter and the rear end pressure transmitter, an amplitude of this value is related to a resolving accuracy of the pressure transmitter, a threshold value can be set according to an input and output range of pressure at the front end and the rear end of the pressure regulating apparatus and the resolving accuracy of the pressure transmitter, two parallel lines are set with the threshold value, and if the curve $S_{\Delta P}(t)$ is between the two parallel lines, it means that $X_m(t)$ is approximately similar to $X_n(t)$, otherwise it means that $X_m(t)$ is inconsistent with $X_n(t)$.

Preferably, the state of the valve port of the pressure regulating apparatus is judged according to a sampling value of a pressure signal, judging steps are:

a. taking a pressure waveform of a front end pressure transmitter of the pressure regulating apparatus, and selecting extreme values $P_i$ and $P_j$ (j>i) in a sliding time window $(t_0, t_0+\Delta t)$, wherein corresponding time points are $t_i$ and $t_j$ respectively, letting $K=(P_j-P_i)/(t_j-t_i)$, a value of K in a section of pressure increasing is positive, and the value of K in a section of pressure decreasing is negative;

b. finding a turning point $(P_n, t_n)$ at which the value of K changes from positive to negative, preliminarily judging that this time point is a timing when the valve port of a pressure regulating valve is closed, and checking whether there is an upward fluctuation signal in a pressure waveform in the same section of an upstream, wherein if there is the upward fluctuation signal, it is further determined that the valve port is being closed at this time;

c. finding a turning point $(P_n, t_n)$ at which the value of K changes from negative to positive, preliminarily judging that this time point is a timing when the valve port of the pressure regulating valve is opened, and checking whether there is an downward fluctuation signal in the pressure waveform in the same section of the upstream, wherein if there is the downward fluctuation signal, it is further determined that the valve port is being opened at this time.

The beneficial effects of the present invention are:

(1) providing a condition for preforming the active signal confirmation of the negative pressure wave and the continuous sound wave signal in the gas pipeline network by monitoring the state of the valve port of the pressure regulating apparatus, which further improves the efficiency and accuracy of the leakage monitoring;

(2) after the valve port is opened, the pressure-flow amount curve can be used to calculate the flow rate and flow amount at the outlet end in any state, which provides a basis for downstream gas flow amount monitoring and can also provide a basis for estimating the upstream gas leakage amount, and realizes the monitoring of the flow amount in the pipeline without increasing the equipment cost.

SYMBOLS IN THE DRAWINGS

1. Spring; 2. Film; 3. Valve port; 4. Front end pressure transmitter; 5. Rear end pressure transmitter; 6. Calculator.

DESCRIPTION OF THE EMBODIMENTS

The present invention will be further described below in conjunction with the embodiments.

The pressure regulating apparatus in this embodiment is a pressure regulating valve, but any other apparatus capable of playing the same or similar role belongs to the protection scope of the present invention.

In the gas pipeline, the state of the valve port can be judged by mounting a pressure transmitter or a sound wave collector or an acceleration sensor at the upstream and downstream of the pressure regulating valve, thereby further making other judgments.

Figure 1:
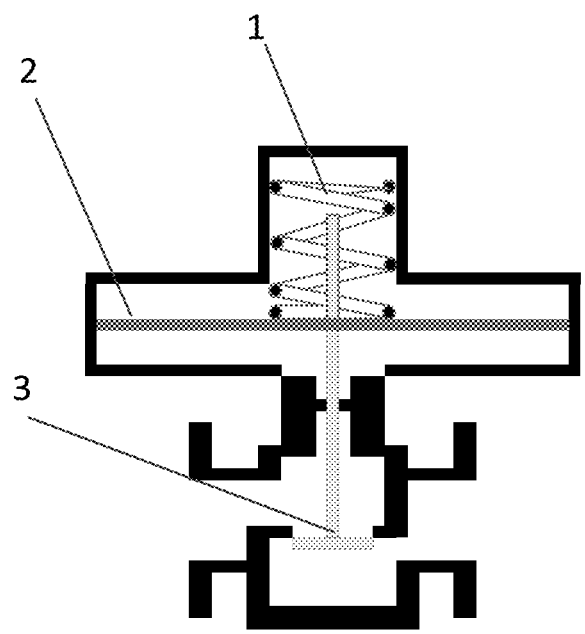
FIG. 1 is a schematic view of the structure of a pressure regulating valve.
Figure 2:
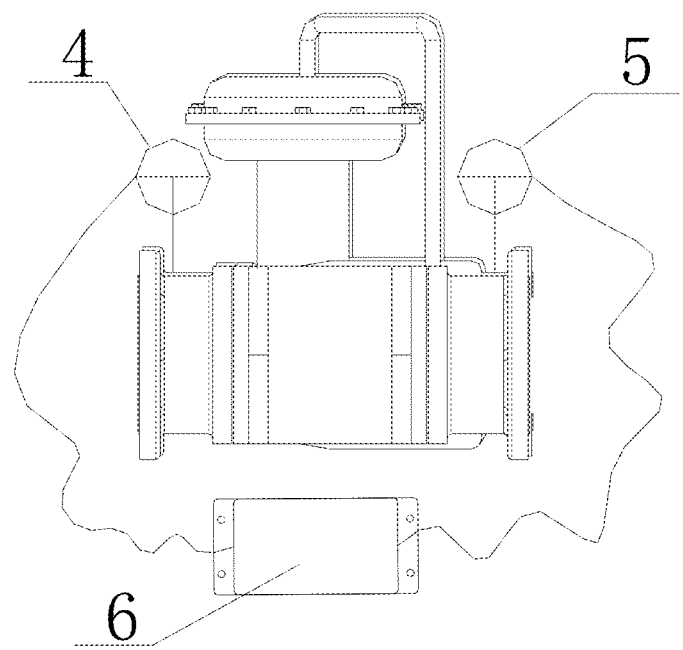
FIG. 2 is a schematic view of a pressure sampling apparatus disposed in the front and rear lumens of the pressure regulating valve of the present invention.

As shown in FIGS. 1-2, the upstream and downstream of the gas pipeline each are provided with a pressure regulating valve. The pressure regulating valve is provided with a spring 1, a film 2 and a valve port 3 therein. The front end of the pressure regulating valve is provided with a pressure transmitter 4 and the rear end thereof is provided with a pressure transmitter 5. The front end pressure transmitter 4 and the rear end pressure transmitter 5 are both connected to a calculator 6. The calculator 6 is also provided with a GPS timing apparatus.

Figure 3:
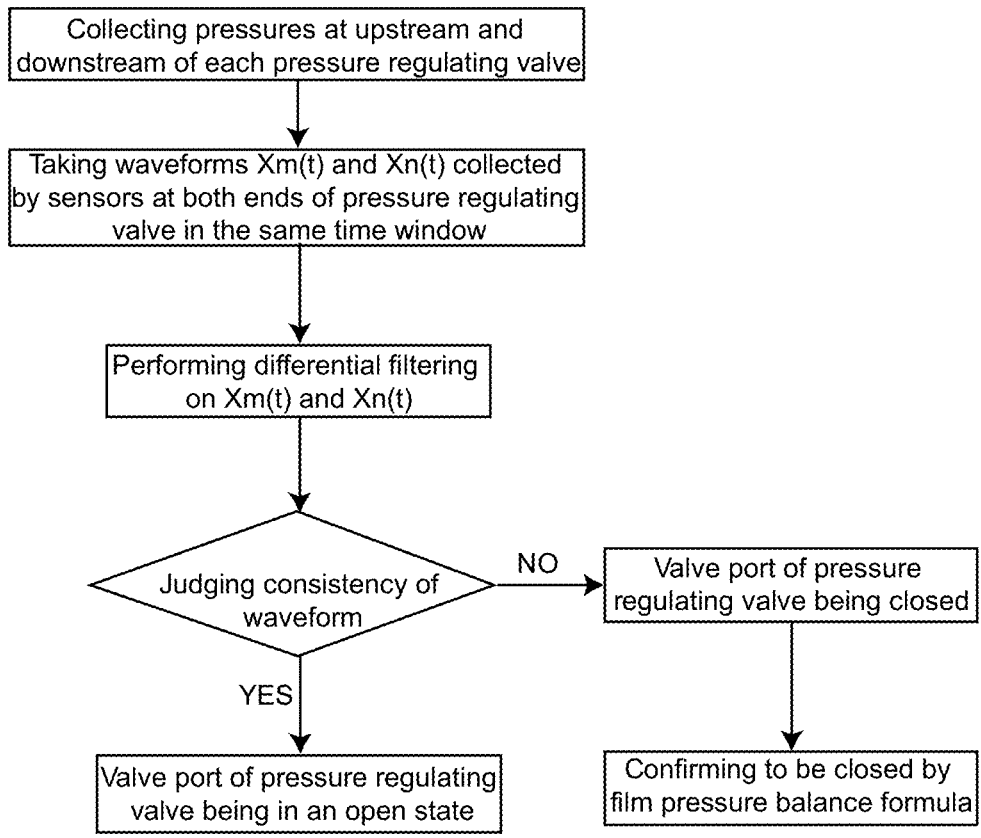
FIG. 3 is a flow chart of monitoring the state of the valve port of the pressure regulating valve of the present invention.

As shown in FIG. 3, a method for monitoring the state of the valve port of the pressure regulating valve in real time is as follows:

(1) using the GPS timing apparatus to accurately time the calculator;

(2) performing real-time sampling of the upstream and downstream pressure signals of the gas pipeline network by the front end pressure transmitter and the rear end pressure transmitter of the pressure regulating valve respectively;

(3) judging the state of the valve port of the pressure regulating valve according to the sampling value of the pressure signal, the judging step is:

a. taking pressure waveforms of the front end pressure transmitter and the rear end pressure transmitter of the pressure regulating valve in the same time window, and performing differential filtering on each of the two waveforms to obtain the front end waveform as $X_m(t)$ and obtain the rear end waveform as $X_n(t)$;

differential filtering algorithm: two adjacent samples are subtracted from one another to obtain the increment, and then the absolute value of the increment is used as the sample of the current data.

b. taking the pressure values $(t_1, P_{11}), (t_1, P_{21}) \ldots (t_n, P_{1n})$, $(t_n, P_{2n})$ corresponding to the same time point of $X_m(t)$ and $X_n(t)$ to obtain $\Delta p_1 = |P_{11} - P_{21}| \ldots \Delta p_n = |P_{1n} - P_{2n}|$;

c. establishing a relationship curve $S_{\Delta P}(t)$ between time t and $\Delta p$, and if the curve is between two parallel lines, it means that the front end waveform $X_m(t)$ of the pressure regulating valve is approximately similar to the rear end waveform $X_n(t)$ of the pressure regulating valve, and it is judged that the valve port of the pressure regulating valve is in an open state;

d. if the amplitude range of the curve exceeds the limit range of two parallel lines, it means that the front end waveform $X_m(t)$ of the pressure regulating valve is inconsistent with the rear end waveform $X_n(t)$ of the pressure regulating valve, and it is preliminarily judged that the valve port is in closed state, and the state of the valve port is confirmed by a balance formula provided by the pressure regulating valve itself.

The method for judging the approximation of the relationship curve between t and $\Delta p$ is:

Method 1: $\Delta p$ in the curve $S_{\Delta P}(t)$ is the difference value between the pressure sampling values at the same time of the front end pressure transmitter and the rear end pressure transmitter, the amplitude of this value has a great relationship with the resolving accuracy of the pressure transmitter, a threshold value can be set according to the input and output range of the pressure at the front end and rear end of the pressure regulating valve and the resolving accuracy of the pressure transmitter, two parallel lines are set with the threshold value, and if the curve $S_{\Delta P}(t)$ is between the two parallel lines, it means that $X_m(t)$ is approximately similar to $X_n(t)$, otherwise it means that $X_m(t)$ is inconsistent with $X_n(t)$.

Method 2: each two adjacent sampling points in the curve $S_{\Delta P}(t)$ can be subtracted from one another, the sum of the absolute values of resultant values is obtained, the obtained sum is averaged, it is judged whether the average value meets the set threshold, and if the average value meets the set threshold, it means that the curve $S_{\Delta P}(t)$ is approximately similar.

Summation: $\Sigma = |\Delta P_2 - \Delta P_1| + |\Delta P_2 - \Delta P_3| \ldots + |\Delta P_n - \Delta P_{n-1}|$, Averaging: $\mu = \Sigma/(n-1)$ (1)

Wherein:

$\Sigma$ is the sum of the absolute values of the difference values of the adjacent sampling points;

$\Delta P_n$ is a sampling point of the curve $S_{\Delta P}(t)$;

n is the number of samples in the sampling time window.

Method 3: The cross-correlation equation can also be used to perform consistency analysis on the front end waveform $X_m(t)$ of the pressure regulating valve and the rear end waveform $X_n(t)$ of the pressure regulating valve, and the formula is as follows:

$$R_{mn}(\tau) = \frac{\sum_{t=0}^{t_0} x_m(t) x_n(t-\tau)}{\sqrt{\sum_{t=0}^{t_0} x_m(t) x_m(t)} \sqrt{\sum_{t=0}^{t_0} x_n(t-\tau) x_n(t-\tau)}} \quad (2)$$

Two points of the data cycle at the same time point are analyzed by the cross-correlation equation to calculate the cross-correlation coefficient $R(\tau)$. If the number of sets in which the $R(\tau)$ value is higher than 0.5 is greater than the set threshold value, it means that the valve port of the pressure regulating valve is in open state.

If the above method judges that the front end waveform $X_m(t)$ of the pressure regulating valve is inconsistent with the rear end waveform $X_n(t)$ of the pressure regulating valve, it is preliminarily judged that the valve port is in a closed state, and the state of the valve port is further confirmed by the balance formula provided by the pressure regulating valve itself.

In addition, the following method can be also used to judge the state of the valve port of the pressure regulating apparatus according to the pressure signal sampling value, and the judging step of this method is:

a. taking the pressure waveform of the front end pressure transmitter of the pressure regulating apparatus, and selecting the extreme values $P_i$ and $P_j$ (j>i) in the sliding time window $(t_0, t_0+\Delta t)$, wherein the corresponding time points are $t_i$ and $t_j$ respectively, letting $K=(P_j-P_i)/(t_j-t_i)$, the value of K in the section of pressure increasing is positive, and the value of K in the section of pressure decreasing is negative;

b. finding the turning point $(P_n, t_n)$ at which the value of K changes from positive to negative, preliminarily judging that this time point is a timing when the valve port of the pressure regulating valve is closed, and checking whether there is an upward fluctuation signal in the pressure waveform in the same section of the upstream, wherein if there is the upward fluctuation signal, it is further determined that the valve port is being closed at this time;

c. finding the turning point $(P_n, t_n)$ at which the value of K changes from negative to positive, preliminarily judging that this time point is a timing when the valve port of the pressure regulating valve is opened, and checking whether there is an downward fluctuation signal in the pressure waveform in the same section of the upstream, wherein if there is the downward fluctuation signal, it is further determined that the valve port is being opened at this time.

Figure 4:
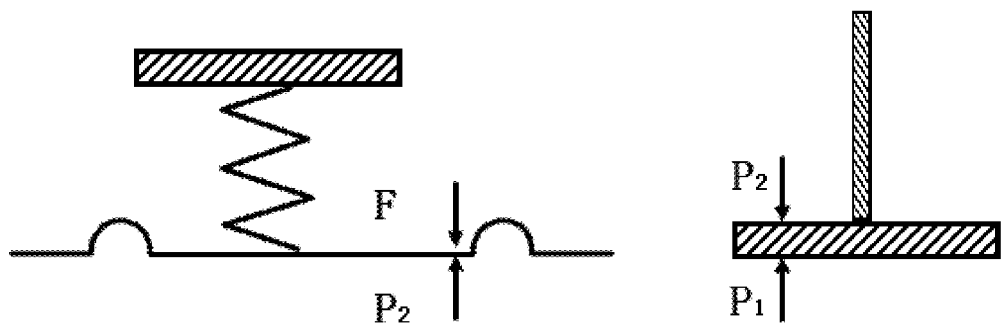
FIG. 4 is a schematic diagram of the force of the internal film and the valve port of the positive acting type pressure regulating valve.
Figure 5:
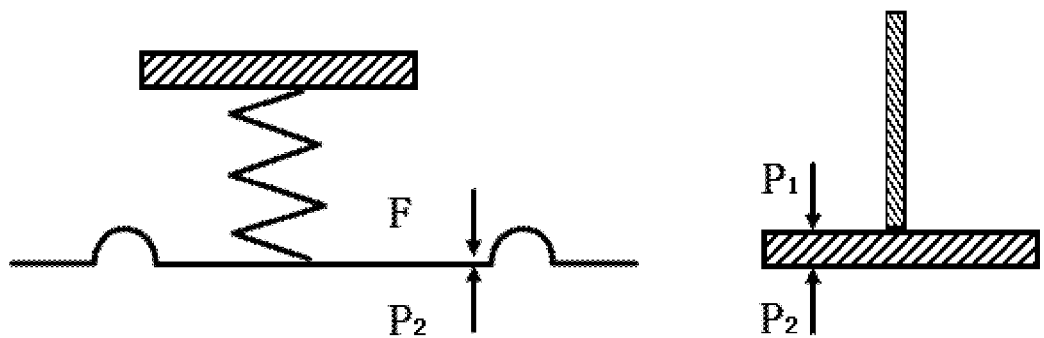
FIG. 5 is a schematic diagram of the force of the internal film and the valve port of the negative acting type pressure regulating valve.

As shown in FIGS. 4-5, the pressure regulating valve can be classified into a direct acting type and an indirect acting type. The direct acting type is classified into a positive acting type and a negative acting type. For the valve port of the pressure regulating valve, the force balance formula is:

negative acting type: $F+P_1*s=P_2*S+P_2*s$, positive acting type: $F+P_2*s=P_2*S+P_1*s$, when $F+P_1*s \geq P_2*S+P_2*s$ or $F+P_2*s \geq P_2*S+P_1*s$, the valve port is in a closed state;

wherein: F is a spring pressure of the pressure regulating valve; $P_1$ is an inlet pressure of the pressure regulating valve; s is a cross-sectional area of the valve port, S is a cross-sectional area of the film of the pressure regulating valve; $P_2$ is an outlet pressure of the pressure regulating valve.

Figure 6:
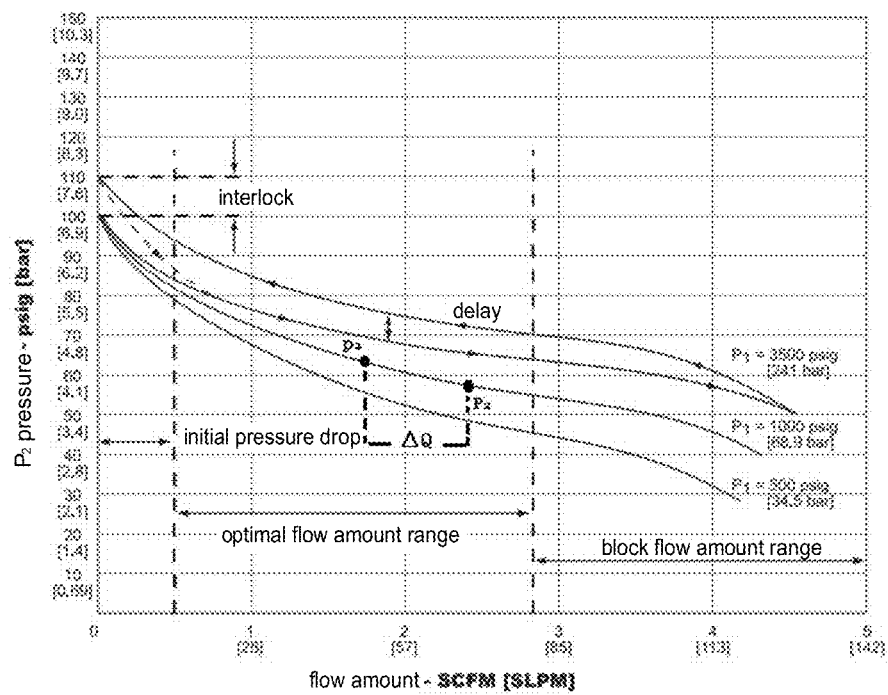
FIG. 6 is a calibration pressure-flow amount graph of the pressure regulating valve.

The pressure regulating valve has its own pressure-flow amount curve as shown in FIG. 6. According to the pressure-flow amount curve of the pressure regulating valve, since a ventilation area of the valve port in a valve opening state is uniquely decided by the pressure in the low pressure zone, according to the curve, the flow rate and the flow amount at the outlet end in any state can be calculated by a proportional conversion (orifice flowmeter principle). In the optimal flow amount range, the downstream flow amount estimation formula is:

$$q_{actual} = q_{calibration} \times \sqrt{\frac{p_{1actual} \times (p_{1actual} - p_2)}{p_{1calibration} \times (p_{1calibration} - p_2)}} \quad (3)$$

Wherein:

$q_{actual}$ is the actual flow amount of the downstream pipeline;

$q_{calibration}$ is the flow amount read on the pressure-flow amount curve under monitoring pressure;

$p_2$ is the pressure of the downstream pipeline;

$p_{1actual}$ is the actual pressure of the upstream pipeline;

$p_{1calibration}$ is the upstream pressure set during equipment calibration.

The downstream flow amount $\Delta Q_2$ occurring in real time is converted into the upstream flow rate vi according to the law of conservation of mass:

$$\rho_1 * \Delta Q_1 = \rho_2 * \Delta Q_2 \quad (4)$$

$$\Delta Q_1 = \upsilon_1 * S \quad (5)$$

$$\upsilon_1 = \frac{\rho_2}{\rho_1} * \frac{\Delta Q_2}{S} \quad (6)$$

In the case of a certain ambient temperature, the pressure is proportional to the density, and it can be obtained by formulas (4), (5) and (6) that:

$$\upsilon_1 = \frac{p_2}{p_1} * \frac{\Delta Q_2}{S} \quad (7)$$

Wherein:

$\upsilon_1$ is the newly increased flow rate of the upstream;

$\rho_1$ is the medium density of the inlet end;

$\rho_2$ is the medium density of the outlet end;

$\Delta Q_2$ is the newly increased flow amount of the downstream;

$\Delta Q_1$ is the newly increased flow amount of the upstream;

S is the cross-sectional area of the upstream pipeline.

When the negative pressure wave occurs simultaneously at the upstream and downstream, the amplitude of the negative pressure wave is uploaded to the background together with the calculated instantaneous flow amount, and an upstream pressure-negative pressure wave amplitude-flow rate curve is established by the background. The curve can be applied to estimate the amount of leakage occurring at the upstream pipeline.

Since a time-voltage value curve is collected for both the sound wave and the acceleration, similarly to the pressure signal, the processing method of the curve is same. For the time-voltage value characteristic curve of the sound wave signals at the front and rear ends of the pressure regulating valve collected by the sound wave collector, or the time-voltage value waveform of the vibration signals at the front and rear ends of the pressure regulating valve collected by the acceleration sensor, the same processing method as that when the signal collecting apparatus uses the pressure transmitter is used, so that the state of the valve port of the pressure regulating valve can be judged.

By judging the state of the valve port, the sudden leakage of the upstream pipeline network can be monitored. The specific steps are as follows: firstly, filtering the negative pressure wave signal generated by opening the valve port in each node, and then performing a similarity analysis on signals using the cross-correlation equation to determine whether there is a leakage.

For the upstream pipeline network, after excluding the valve port opening signal of the pressure regulating valve by determining the state of the valve port, the signal source position of the negative pressure wave occurring at the upstream can be calculated according to the precise timing of the GPS precise timing apparatus, and the signal is further determined to be a leakage signal.

Figure 7:
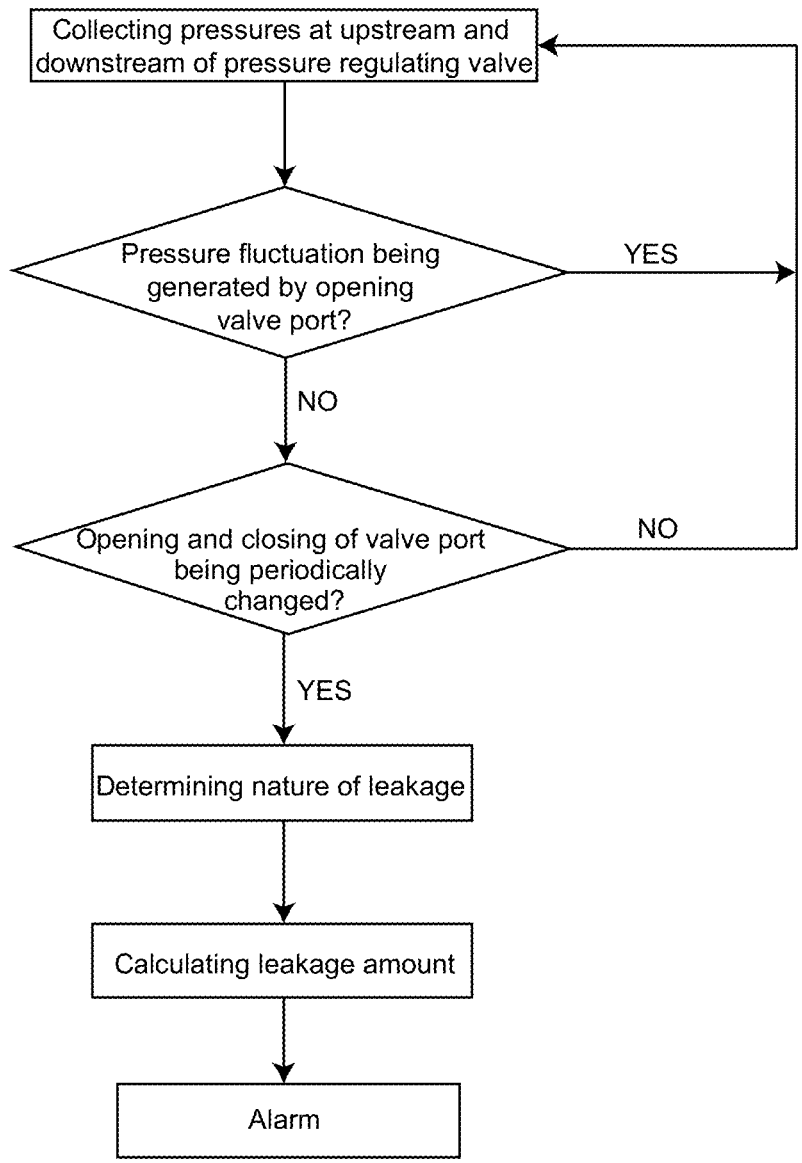
FIG. 7 is a flow chart of monitoring downstream micro leakage.

As shown in FIG. 7, by monitoring the state of the valve port of the pressure regulating valve in a community at night, it is judged whether the open state and the closed state of the valve port are periodically presented, and the monitoring of the micro leakage in the pipeline can be realized. If the state of the valve port of the pressure regulating valve changes in a fixed maximum period at night, it is judged that there is a leakage, a leakage amount is calculated, and an alarm signal is issued; otherwise, it cannot be judged that there is a leakage.

Figure 8:
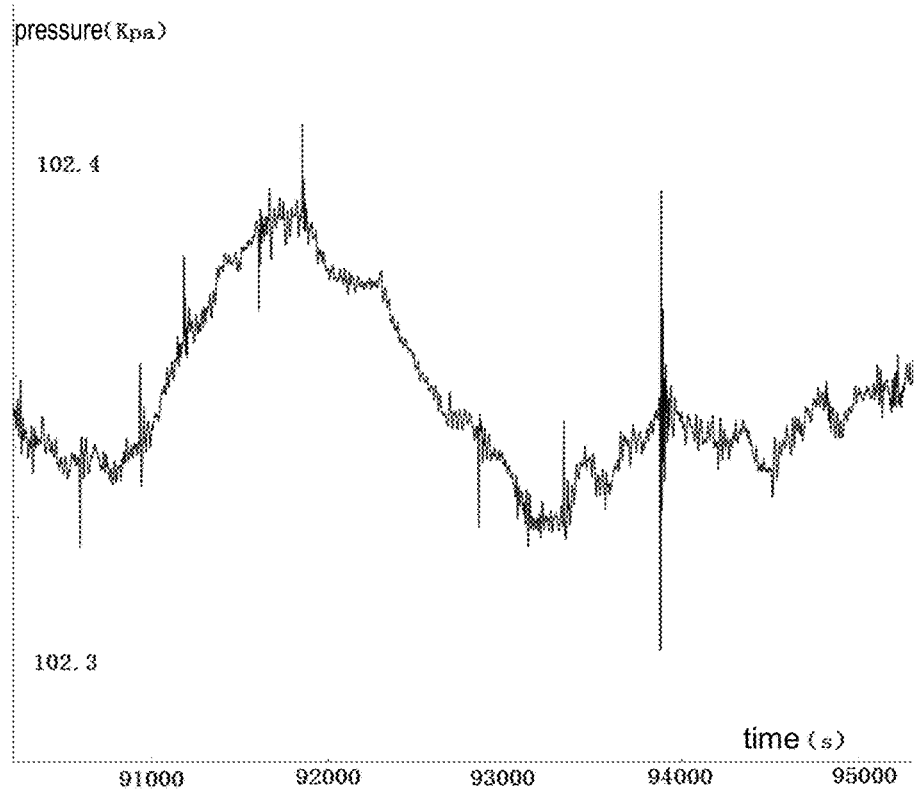
FIG. 8 is a schematic diagram of the downstream pressure collecting waveform when a negative pressure wave occurs.
Figure 9:
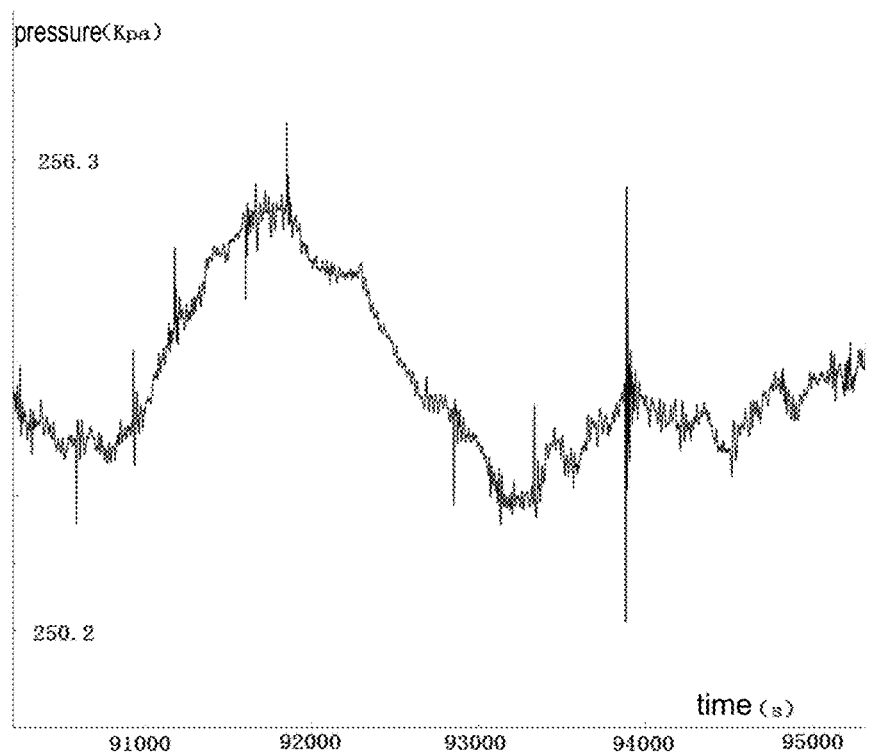
FIG. 9 is a schematic diagram of the upstream pressure collecting waveform when a negative pressure wave occurs.

The upstream and downstream pressures are continuously sampled, as shown in FIGS. 8-9. When the pressure dip occurs at the upstream and downstream simultaneously, it is determined that this pressure dip is generated by the valve port of the local pressure regulating valve, and the newly increased flow amount at the downstream is calculated by the following formula:

$$\Delta Q = F(P'_2) - F(P_2)$$

Wherein: $P'_2$ is the pressure of the downstream pipeline after the sudden change of flow amount, and $P_2$ is the pressure of the downstream pipeline before the sudden change of flow amount.

Only when the downstream pressure dips, it is determined that the negative pressure wave comes from the downstream, and the newly increased flow amount at the downstream is calculated by the following formula:

$$\Delta P = \frac{1}{2}\rho\upsilon^2$$

$$\Delta Q = S * \sqrt{\frac{2\Delta P}{\rho}}$$

Wherein: $\upsilon$ is the medium flow rate; $\rho$ is the medium density; $\Delta P$ is the pressure difference; $\Delta Q$ is the increment of the medium flow amount; S is the cross-sectional area of the pipeline.

The above flow amount can be converted into the newly increased flow rate at the upstream by a pressure-density conversion:

$$\upsilon = \frac{p_2}{p_1} * \frac{\Delta Q_2}{S}$$

Wherein:

υ is the newly increased flow rate at the upstream; $\rho_1$ is the medium density at the inlet end; $\rho_2$ is the medium density at the outlet end; $\Delta Q_2$ is the newly increased flow amount at the outlet end; s is the cross-sectional area of the upstream pipeline.

Then, the negative pressure wave at the upstream inlet end is calibrated, the amplitude-flow rate curve at the upstream inlet end is calibrated, the calibrated negative pressure wave amplitude and flow rate are uploaded to the background, the negative pressure wave amplitude-flow rate curve is established by a certain correction in the background, and the upstream leakage amount is estimated; if the negative pressure wave is from the upstream, the upstream leakage amount is estimated by comparison, in combination with the above-mentioned negative pressure wave amplitude-flow rate curve.

The present invention provides a condition for preforming the blind source separation of the negative pressure wave and the continuous sound wave signal in the gas pipeline network by monitoring the state of the valve port of the pressure regulating valve, which further improves the efficiency and accuracy of the leakage monitoring; after the valve port is opened, the pressure-flow amount curve can be used to calculate the flow rate and flow amount at the outlet end in any state, which provides a basis for downstream gas flow amount monitoring and can also provide a basis for estimating the upstream gas leakage amount, and realizes the monitoring of the flow amount in the pipeline without increasing the equipment cost.

The above description is merely the specific embodiment of the present invention, and cannot limit the scope of the implementation of the present invention. Therefore, the replacement of the equivalent components (such as replacing the pressure transmitter with a pickup, replacing the pressure transmitter with an acceleration sensor and the like) or equivalent changes and modifications made in accordance with the patent protection scope of the present invention should fall within the scope of the claims of the present invention.

What is claimed is:

1. A gas pipeline leakage monitoring system provided with a pressure regulating apparatus, characterized in that, the gas pipeline leakage monitoring system is further provided with a control apparatus, a front end and a rear end of the pressure regulating apparatus each are provided with a signal collecting apparatus, the signal collecting apparatus is for collecting signals at the front end and the rear end of the pressure regulating apparatus and uploading the signals to the control apparatus, and the signal collecting apparatus is provided with a timing apparatus.

2. The gas pipeline leakage monitoring system according to claim 1, characterized in that, the signal collecting apparatus uses a pressure transmitter, the front end of the pressure regulating apparatus is provided with a front end pressure transmitter, the rear end of the pressure regulating apparatus is provided with a rear end pressure transmitter, and the front end pressure transmitter and the rear end pressure transmitter are mounted at two sides of a valve port of the pressure regulating apparatus.

3. The gas pipeline leakage monitoring system according to claim 1, characterized in that, the signal collecting apparatus uses a pressure transmitter, the front end of the pressure regulating apparatus is provided with a front end pressure transmitter, the rear end of the pressure regulating apparatus is provided with a rear end pressure transmitter, and the front end pressure transmitter and the rear end pressure transmitter are mounted in pipelines at the front end and the rear end of the pressure regulating apparatus.

4. The gas pipeline leakage monitoring system according to claim 1, characterized in that, the signal collecting apparatus uses a sound wave collector or an acceleration sensor.

5. A method for monitoring gas pipeline leakage by applying the gas pipeline leakage monitoring system according to claim 1, characterized by comprising: analyzing a signal collected by the signal collecting apparatus in a same time window, and determining whether a valve port of the pressure regulating apparatus is in an open state or a closed state, so as to realize monitoring of gas pipeline leakage.

6. The method for monitoring gas pipeline leakage according to claim 5, characterized in that, by monitoring a state of the valve port of the pressure regulating apparatus in a community at night, it is judged whether the open state and the closed state of the valve port are periodically presented, monitoring of a micro leakage in a pipeline can be realized, and if the state of the valve port of the pressure regulating apparatus changes in a fixed maximum period at night, it is judged that there is a leakage, a leakage amount is calculated, and an alarm signal is issued; otherwise, it cannot be judged that there is a leakage.

7. The method for monitoring gas pipeline leakage according to claim 5, characterized in that, a sudden leakage of an upstream pipeline network can be monitored by judging a state of the valve port of the pressure regulating apparatus, specific steps are:

firstly, opening the valve port of the pressure regulating apparatus in each node in a gas pipeline and judge that the valve port is in an open state, wherein opening of the valve port generating a negative pressure wave signal;

filtering out the negative pressure wave signal generated by the opening of the valve port, and then performing a similarity analysis on signals using a cross-correlation equation to determine whether there is a leakage;

wherein, for the network of the pipeline upstream of the pressure regulating apparatus, after filtering out the negative pressure wave signal, a source of a signal indicating a position of a negative pressure wave occurring in the network of the pipeline upstream of the pressure regulating apparatus is calculated according to precise timing of the timing apparatus, the signal being a leakage signal.

8. The method for monitoring gas pipeline leakage according to claim 7, characterized in that, a specific method of analyzing a signal collected by the signal collecting apparatus in the same time window is:

(1) the timing apparatus times the signal collecting apparatus, the signal collecting apparatus collects signals at the front end and the rear end of the pressure regulating apparatus and uploads the signals to the control apparatus;

(2) the control apparatus analyzes the signals in combination with the collecting time thereof, and judges the state of the valve port of the pressure regulating apparatus.

9. The method for monitoring gas pipeline leakage according to claim 8, characterized in that, the state of the valve port of the pressure regulating apparatus is judged according to a sampling value of a pressure signal, judging steps are:

a. taking pressure waveforms of a front end pressure transmitter and a rear end pressure transmitter of the pressure regulating apparatus in the same time window, and performing differential filtering on each of the two waveforms to obtain a front end waveform Xm(t) and obtain a rear end waveform Xn(t);

b. taking pressure values (t1, P11), (t1, P21) ... (tn, P1n), (tn, P2n) corresponding to the same time point of Xm(t) and Xn(t) to obtain $\Delta p1=|P11-P21|$ ... $\Delta pn=|P1n-P2n|$;

c. establishing a relationship curve SΔP(t) between time t and Δp, and performing determination according to a resolving accuracy of a sensor, wherein if the curve is between two parallel lines, it means that the front end waveform Xm(t) of the pressure regulating apparatus is approximately similar to the rear end waveform Xn(t) of the pressure regulating apparatus, and it is judged that the valve port of the pressure regulating apparatus is in the open state;

d. if an amplitude range of the curve exceeds a limit range of two parallel lines, it means that the front end waveform Xm(t) of the pressure regulating apparatus is inconsistent with the rear end waveform Xn(t) of the pressure regulating apparatus, it is preliminarily judged that the valve port is in the closed state, and the state of the valve port is further confirmed by a balance formula provided by the pressure regulating apparatus itself.

10. The method for monitoring gas pipeline leakage according to claim 9, characterized in that, a specific method for judging an approximation of the relationship curve between t and Δp is:

Δp in the curve SΔP(t) is a difference value between pressure sampling values at a same time of the front end pressure transmitter and the rear end pressure transmitter, an amplitude of this value is related to a resolving accuracy of the pressure transmitter, a threshold value can be set according to an input and output range of pressure at the front end and the rear end of the pressure regulating apparatus and the resolving accuracy of the pressure transmitter, two parallel lines are set with the threshold value, and if the curve SΔP(t) is between the two parallel lines, it means that Xm(t) is approximately similar to Xn(t), otherwise it means that Xm(t) is inconsistent with Xn(t).

11. The method for monitoring gas pipeline leakage according to claim 8, characterized in that, the state of the valve port of the pressure regulating apparatus is judged according to a sampling value of a pressure signal, judging steps are:

a. taking a pressure waveform of a front end pressure transmitter of the pressure regulating apparatus, and selecting extreme values Pi and Pj (j>i) in a sliding time window (t0, t0+Δt), wherein corresponding time points are ti and tj respectively, letting K=(Pj-Pi)/(tj-ti), a value of K in a section of pressure increasing is positive, and the value of K in a section of pressure decreasing is negative;

b. finding a turning point (Pn, tn) at which the value of K changes from positive to negative, preliminarily judging that this time point is a timing when the valve port of the pressure regulating apparatus is closed, and checking whether there is an upward fluctuation signal in a pressure waveform in the same section of an upstream, wherein if there is the upward fluctuation signal, it is further determined that the valve port is being closed at this time;

c. finding a turning point (Pn, tn) at which the value of K changes from negative to positive, preliminarily judging that this time point is a timing when the valve port of the pressure regulating apparatus is opened, and checking whether there is an downward fluctuation signal in the pressure waveform in the same section of the upstream, wherein if there is the downward fluctuation signal, it is further determined that the valve port is being opened at this time.

12. The method for monitoring gas pipeline leakage according to claim 6, characterized in that, a specific method of analyzing a signal collected by the signal collecting apparatus in the same time window is:

(1) the timing apparatus times the signal collecting apparatus, the signal collecting apparatus collects signals at the front end and the rear end of the pressure regulating apparatus and uploads the signals to the control apparatus;

(2) the control apparatus analyzes the signals in combination with the collecting time thereof, and judges the state of the valve port of the pressure regulating apparatus.

13. The method for monitoring gas pipeline leakage according to claim 12, characterized in that, the state of the valve port of the pressure regulating apparatus is judged according to a sampling value of a pressure signal, judging steps are:

a. taking pressure waveforms of a front end pressure transmitter and a rear end pressure transmitter of the pressure regulating apparatus in the same time window, and performing differential filtering on each of the two waveforms to obtain a front end waveform Xm(t) and obtain a rear end waveform Xn(t);

b. taking pressure values (t1, P11), (t1, P21) ... (tn, P1n), (tn, P2n) corresponding to the same time point of Xm(t) and Xn(t) to obtain $\Delta p1=|P11-P21|$ ... $\Delta pn=|P1n-P2n|$;

c. establishing a relationship curve SΔP(t) between time t and Δp, and performing determination according to a resolving accuracy of a sensor, wherein if the curve is between two parallel lines, it means that the front end waveform Xm(t) of the pressure regulating apparatus is approximately similar to the rear end waveform Xn(t) of the pressure regulating apparatus, and it is judged that the valve port of the pressure regulating apparatus is in the open state;

d. if an amplitude range of the curve exceeds a limit range of two parallel lines, it means that the front end waveform Xm(t) of the pressure regulating apparatus is inconsistent with the rear end waveform Xn(t) of the pressure regulating apparatus, it is preliminarily judged that the valve port is in the closed state, and the state of the valve port is further confirmed by a balance formula provided by the pressure regulating apparatus itself.

14. The method for monitoring gas pipeline leakage according to claim 13, characterized in that, a specific method for judging an approximation of the relationship curve between t and Δp is:

Δp in the curve SΔP(t) is a difference value between pressure sampling values at a same time of the front end pressure transmitter and the rear end pressure transmitter, an amplitude of this value is related to a resolving accuracy of the pressure transmitter, a threshold value can be set according to an input and output range of pressure at the front end and the rear end of the pressure regulating apparatus and the resolving accuracy of the pressure transmitter, two parallel lines are set with the threshold value, and if the curve SΔP(t) is between the two parallel lines, it means that Xm(t) is approximately similar to Xn(t), otherwise it means that Xm(t) is inconsistent with Xn(t).

15. The method for monitoring gas pipeline leakage according to claim 12, characterized in that, the state of the valve port of the pressure regulating apparatus is judged according to a sampling value of a pressure signal, judging steps are:
   a. taking a pressure waveform of a front end pressure transmitter of the pressure regulating apparatus, and selecting extreme values Pi and Pj (j>i) in a sliding time window (t0, t0+Δt), wherein corresponding time points are ti and tj respectively, letting K=(Pj−Pi)/(tj−ti), a value of K in a section of pressure increasing is positive, and the value of K in a section of pressure decreasing is negative;
   b. finding a turning point (Pn, tn) at which the value of K changes from positive to negative, preliminarily judging that this time point is a timing when the valve port of the pressure regulating apparatus is closed, and checking whether there is an upward fluctuation signal in a pressure waveform in the same section of an upstream, wherein if there is the upward fluctuation signal, it is further determined that the valve port is being closed at this time;
   c. finding a turning point (Pn, tn) at which the value of K changes from negative to positive, preliminarily judging that this time point is a timing when the valve port of the pressure regulating apparatus is opened, and checking whether there is an downward fluctuation signal in the pressure waveform in the same section of the upstream, wherein if there is the downward fluctuation signal, it is further determined that the valve port is being opened at this time.

\* \* \* \* \*